Figure 1:
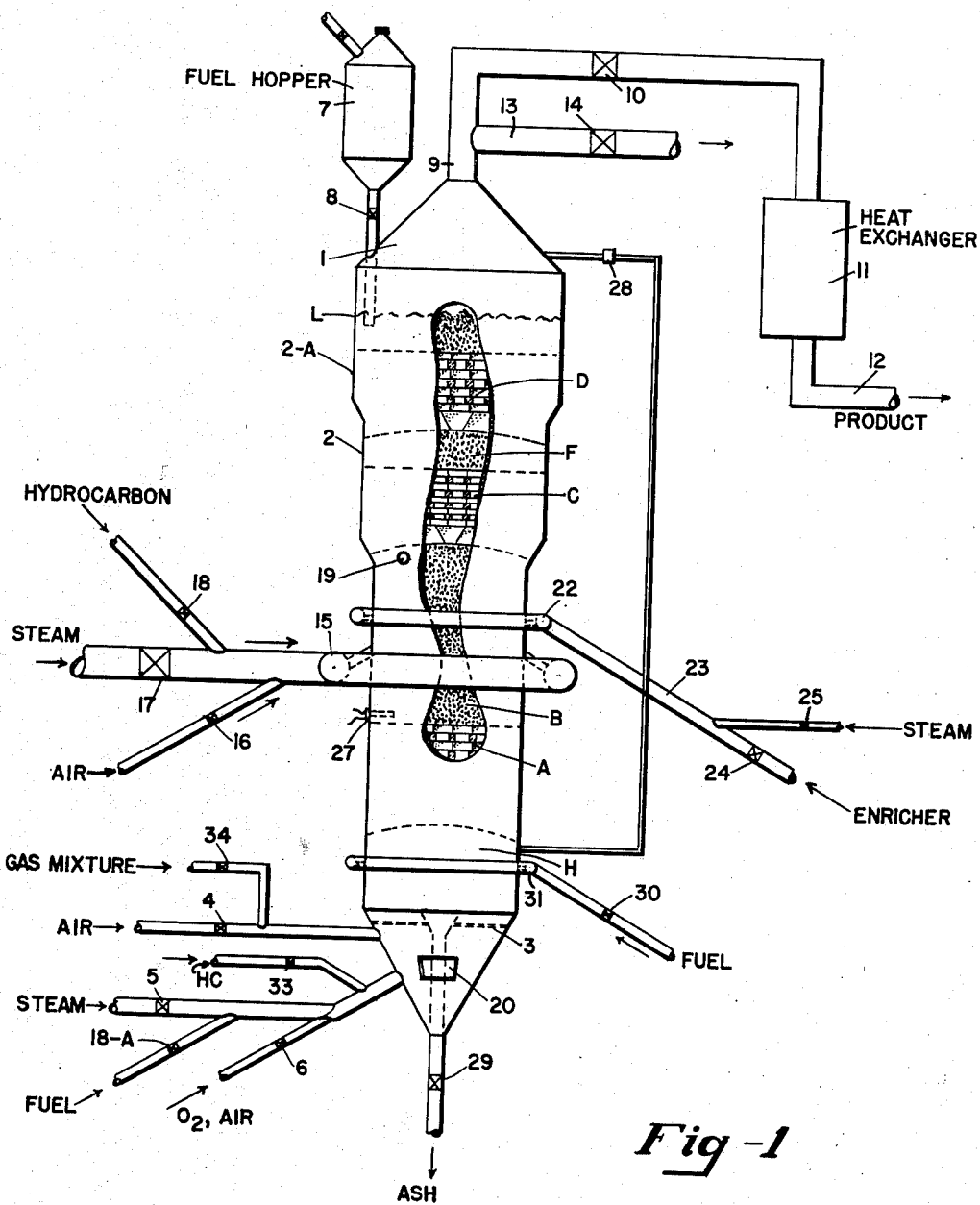

Patented June 15, 1954

2,681,273

UNITED STATES PATENT OFFICE 2,681,273

PROCESS FOR MAKING COMBUSTIBLE GAS

William W. Odell, Washington, D. C., assignor to Standard Oil Development Company Application August 23, 1947, Serial No. 770,271

6 Claims. (Cl. 48—196)

This invention relates to process and apparatus for making combustible gas. It relates to the generation of gas for city distribution as well as to the production of gas for industrial use. In particular, it has to do with the gasification of coal, coke, lignite, char or other solid fuel in a subdivided state, the particles being much smaller than those commonly charged to a water gas generator in the ordinary intermittent water gas process. The process operation of this invention in general is intermittent or in effect intermittent, although it may be quite continuous, and the solid fuel used in the course of gasification is maintained in a fluidized state as a deep bed in a generator.

In present practice in making gas by reacting steam with fluidized carbon at high temperatures, it has been found that the alternate blasting of the fuel bed with air and steam in cycles did not yield a good grade of gas and that many difficulties arose, including the tendency for the fuel to settle when the air was turned off and to resist complete fluidization when the steam was turned on. The cycle had to be very short for a number of very important reasons, including the fact that the gases made during both the air blast and steam run periods left the generator at substantially the maximum temperature of the fuel bed causing a very appreciable carrying-away of heat from the generator which called for frequent replenishing. A further hindrance to successful development of this method of making gas has been the limiting depth of the fuel bed. Employing usual gas-making velocities or economic gas-making velocities of the gas-generating fluids in the generator, a deep bed cannot be employed unless the diameter of the generator is also great because of the tendency for large pockets of gas to pass up through the bed as slugs or gas pockets without making good contact with the fuel. In recognition of some of these conditions and in consideration of the fact that the fluidized fuel cannot be heated above the fusion point of the ash resort has been made commercially to using a mixture of oxygen and steam in such proportions that the maximum temperature in the fluidized bed of fuel is below the ash softening temperature, the operation thus being continuous. My investigations of this operation show that even in this case the gas made was not of good quality until additional oxygen and steam were supplied above the fluidized fuel bed in amounts and proportions sufficient to raise the temperature in the gas stream in the upper portion of the generator several hundred degrees centigrade above that in the fuel bed; this was largely because it was not possible to maintain a deep bed without formation of gas pockets commonly referred to as "slugging."

One of the objects of this invention is to eliminate the necessity of using straight oxygen to supply, by combustion reactions with carbon, the heat necessary for promoting the steam-carbon reactions. In the latest development of the Winkler process at the close of the recent world war, the amount of oxygen used, calculated as pure $O_2$ per 1000 cubic feet of gas made was approximately 145 to 150 cubic feet, based on scrubbed gas still containing 10 percent of $CO_2$; the gas as generated contained appreciably more than 10 percent of $CO_2$.

Another object is to economize heat energy and to make possible and feasible the use of air to supply at least a part of the heat requirements of the process by combustion reactions in the fuel bed.

Still another object is to make intermittent operation feasible and economical. Other objects will become evident by the following disclosures and claims.

The invention can best be described by reference to the figures with specific examples of a few methods of operation.

Figure 1 depicts one type of generator in which the novel features of the process of this invention may be practiced; it is shown in elevation but largely diagrammatically and as a flow diagram, and has a portion of the outer generator-wall cut away to show the interior in section. The generator of this figure is particularly adapted for making water gas or enriched water gas intermittently in cycles.

Figure 2:
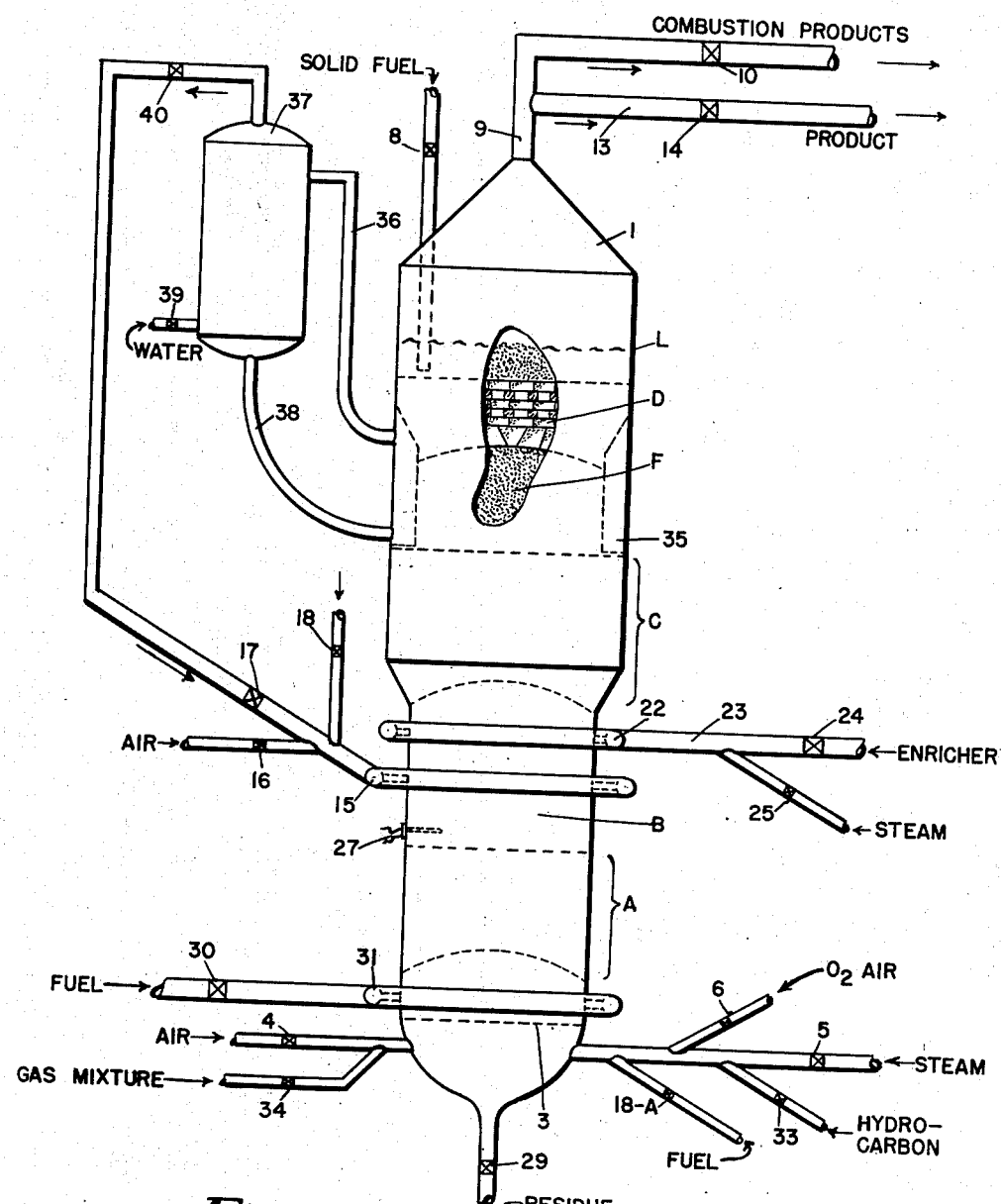

Figure 2 shows a similar diagrammatic view of another embodiment of the invention, being essentially a generator in which the process steps of this invention may be practiced with re-circulation features which are described hereinafter.

In Figure 1 the generator 1 has upper expended regions 2 and 2-A, a grid member 3 adjacent to the bottom, means for admitting air steam and oxygen with control valves 4, 5 and 6, respectively, and fixed spaced packing regions A, C and D. Fuel hopper 7 supplies small size solid fuel to the generator through control valve 8 and auxiliary supplies of steam, combustion supporting fluid which may be air, and vapor phase hydrocarbons may be fed to the generator through bustle pipe 15, the respective control valves being 17, 16 and 18. Gas offtake 9 at the top of the generator is so connected that blast gases, largely products of combustion, may be removed therefrom through valve 10, heat exchanger 11, and offtake 12, whereas richer gas may be removed from 9 through conduit 13 and valve 14 from which it may be conducted to a gas treating and handling system not shown. Means for introducing steam and a carbureting fluid are shown by bustle pipe 22, conduit 23 and respective control valves 25 and 24. Thermo-couple 27 is suitably connected for indicating temperature in the bed of fluidized solid fuel; the connections are not shown. The generator has a differential pressure recorder 28, a valve 29 for discharging finely divided solids, a valve 30 for introducing fuel therein through conduit 31, valve 33 for introducing a hydrocarbon in the vapor phase, valve 34 for introducing a gas mixture, such as CO and $H_2$, valve 18-A for introducing fuel.

In Figure 2 the same system of numbering has been employed as was used with reference to Figure 1; however, additional numbers are employed on Figure 2 designating parts not shown in Figure 1 as follows:

A water jacket 35 is provided in the upper portion of the generator-wall which is connected by a steam conduit 36 to a steam drum or accumulator 37 which later has a water leg 38 for supplying water to the water jacket. Water is supplied to the steam drum 37 through valve 39 and steam is discharged from 37 through valve 40. The combination of a water-cooled wall adjacent an upper zone of the bed of fluidized solids in generator 1 makes possible the cooling of the fluidized solids in the zone adjacent thereto and designated F which in turn hastens the rate of travel downwardly of the fluidized solids in F into zone C. The water in jacket 35 absorbs heat from the solids fluidized in zone F, which heat would normally be largely wasted, forming steam which is, or may be, utilized in the gas-making process. It is recognized that it is not new to cool the wall of a hot surface by a water jacket, but the effect obtained in this case is believed to be new; the solids fluidized in zone F are in free ebullient motion and make possible a set of conditions including economical heat recovery which is not possible so far as I am aware in any other system.

EXAMPLE 1

*Making water gas from fine size coke, ¼- to 1/16-inch mean diameter of particles, free from dust, by cyclic operation*

Referring to Figure 1, proceed as follows: Supply the solid fuel to generator 1 by opening valve 8 until it reaches the level indicated by sight-cock 19. Now place some ignited combustible matter in the base of the generator through door 20 and then start air blasting, slowly at first, by partly opening valve 4. Continue air blasting and as it becomes clear that combustion is occurring in the bed of coke in the generator, as noted by the temperature and the composition of the combustion products now being discharged above through 9, 10, 11 and 12, the rate of air blasting is increased by further opening air valve 4 so that the velocity of the air in zone A, based on air at standard temperature and pressure and considering this zone as empty, is approximately 1.5 to 2.5 feet per second. At this velocity the fuel solids will be fluidized in zone A forming a bed of medium density, whereas the fuel solids in the higher zone B will form a bed of greater density.

This air blasting is continued until the fluidized particles in zones A and B have become heated to a temperature of the order of 1900° to 2000° F. When this point is reached it will be found that the temperature of the packing in zone A is also heated to approximately the same temperature. The air valve 4 is now slowly closed as steam valve 5 is opened and an up-steam run is now made, the water gas formed being conducted out of generator 1 through offtake 9, conduit 13 and valve 14 and handled in a known manner. The velocity of the steam as it enters zone A is preferably as high as that of the air, whereby the velocity of the gas stream with excess steam as it passes up through zone A is greater than the gas stream during air blasting. Under this condition the bed density in zone A is lower during the steam run than during the air-blasting period and some of the fluidized fuel initially in zone A migrates to a higher level. The steam takes up heat from the packing in zone A and thereby becomes heated to a temperature of the order of 2000° F. or a little lower, and in this state it contacts the freely fluidized solid in zone B where it reacts more completely therewith forming water gas. The major reaction of carbon and steam in the generator is as shown by the following equations:

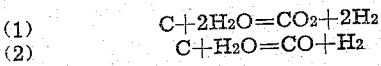

(1) $\quad C+2H_2O=CO_2+2H_2$
(2) $\quad C+H_2O=CO+H_2$

More of reaction of Equation 1 occurs in zone A than in zone B and more of the reaction of Equation 2 occurs in zone B than in A, the result being that high-grade water gas is produced, being chiefly $CO+H_2$ with a relatively small amount of $CO_2$. During this operation heat is absorbed from the packing in zone A, its mean temperature being lowered and heat is given up by the hot gases passing upwardly to the packing in zones C and D and to the solid fuel fluidized therein. Thus, the gases passing out through 9 leave the generator relatively cool, that is, below 1800° F. in this example. The level of the fluidized solid fuel in generator 1 will be at L during the steam run but immediately the steam run is discontinued and air blasting again initiated the level is somewhat lower. This change to air blasting is made after the temperature as indicated by means of thermocouple 27 is about 1200° to 1300° F. as follows: turn steam valve 5 off slowly while simultaneously opening air valve 4 and after about 5 seconds close valve 14 and open 10. Fresh solid fuel may be introduced continuously through valve 8 but it is preferable usually to charge it during the air-blast period unless it contains valuable volatilizable products to be recovered, in which case it is preferable to charge the solid fuel during the steam run. The fresh fuel becomes preheated quite uniformly as it descends downwardly into the gas-making zones. This is quite different from fixed bed water gas processes wherein the lumps are superficially heated on their outer surfaces only until they are largely consumed in gas making reactions. Most of the finely divided ash is carried out of the generator during the steam run although some passes out during the air blast. The cycle as described is repeated as desired.

A variation in the procedure outlined above, which is particularly applicable to making gas for ammonia synthesis, is as follows:

Blast the bed of solid fuel with air as before, then make a steam run as before only, during this steam run allow some air to pass into the fuel bed with the steam by opening valve 6, the amount of air thus used being sufficient to provide the $N_2$ required in making ammonia. Because of the small size of the solid fuel used the gases leave the generator at a lower temperature than that of similar gases from the ordinary water gas generator with stationary fuel, thus giving higher thermal efficiency. When air is thus used during the steam run there is a tendency for higher temperatures to obtain in the upper fuel bed than when straight alternate air and steam runs are made. In order to maintain high thermal efficiency under such conditions some auxiliary steam may be introduced into the generator during the run by opening valve 17. This forms water gas entirely in the upper zone of the bed and lowers the bed temperature. It will be noted that it is not possible in a stationary bed of fuel such as in a commercial size water gas generator to thoroughly mix steam through the bed other than by introducing it at top or bottom of the bed.

When maximum gas production per unit of time is desired a further slight variation of operating procedure is made referring to Figure 1 as follows: Air blast the ignited fuel as before by opening valve 4 and during at least a portion of this air-blasting period open air valve 16 and allow some air, but preferably less than that introduced through 4, to pass into the generator through bustle pipe 15. The latter air burns some of the combustible gas generated by the air passing up into the lower zone of the bed and stores heat in the fluidized fuel bed and in the packing solids. Now close valve 16, then close air valve 4 and open steam valve 5 and then close valve 10 and open valve 14. Steam may now be admitted also through 15 by opening valve 17. In all cases the fresh solid fuel is fed to the generator in sufficient amount to equal the fuel consumption.

EXAMPLE 2

*Making producer gas from char, or low temperature coke initially sized about $\frac{1}{16}$ to $\frac{1}{4}$-inch particle mean diameter and referring to Figure 1*

First air blast the ignited fuel by opening valve 4 until the fuel bed is at a gas-making temperature approximately 1800° to 1900° F. Now pass a mixture of air and steam up through the bed, maintaining fluidization of the fuel by controlling the velocity of the gaseous stream through the bed and so proportioning the steam and air thus introduced that the temperature in zone A, as indicated by either an optical pyrometer sighted through a port for the purpose, not shown in the figure, or as approximated by use of the thermocouple 27, is maintained at about 1750° F. to 1850° F. The steam and air thus introduced may be admitted in admixture as through valves 5 and 6 or through 5 and 4 respectively. The gas formed is withdrawn or discharged, as made, through offtake 9, conduit 13 and valve 14. The temperature in zone C will gradually rise and will finally approach as an upper limit the temperature in zones A and B. For economic reasons it is desirable to introduced some steam into an upper portion of the fuel bed and this may be done by opening valve 17 either intermittently or allowing it to remain open sufficient to provide the required amount of steam. It will be found that the producer gas made in this example will have a low $CO_2$ content, 3 percent and lower varying downwardly as the bed depth is increased and as the temperature in zone B is increased. The temperature in the latter zone may be increased by increasing the air-steam ratio in the mixture added through 5 and 6. In cases where maximum gas production per unit of time is desired, both air and steam may be introduced into zone B by opening respectively valves 16 and 17. The fine particles of ash work their way to the top of the bed and are removed from the generator 1 entrained in the gas passing out through 9 but the coarser particles tend to collect at the bottom of the bed and may be withdrawn through offtake 29. This latter effect does not occur when all of the solid fuel supplied through 8 from reservoir 7 is sized 40 mesh and finer; in that case the ash passes out overhead entrained in the gas.

Modifications of operating details may be made within the confines of Example 2 whereby the composition and calorific value of the gas generated may be altered. These modifications may include:

(a) Introducing some $O_2$ with the steam and air admitted into the bottom zone of the fuel bed.

(b) Introduction of oxygen with steam admitted through bustle pipe 15.

(c) Introduction of enricher, as for example, through valve 24 or 18, or both.

Benefits common to the use of preheated air and superheated steam in gas making also are attainable here, but with the additional benefit derived from introducing it in a zone of the fuel bed intermediate the top and bottom thereof and causing intimate mixing and contact with the fuel in said zone. The calorific value of the producer gas may be varied from less than 130 to 150 B. t. u. per cubic foot without adding enricher or using free oxygen and may be appreciably higher when enricher is added. It will be noted that when enricher is introduced into zone B it immediately contacts a large surface of hot fuel (fluidized, incandescent finely divided solid fuel), and is forthwith reacted with steam and/or cracked. This is particularly true when the enricher is comprised of hydrocarbon material.

EXAMPLE 3

*Re-forming hydrocarbons and producing gas containing appreciable amounts of $H_2$ and $CO$*

This example involves the introduction of one or more than one hydrocarbon, such as methane, ethane, propane, butane, ethylene, propylene and the like, into a mass of highly heated solids, fluidized in a reaction zone, along with an oxidant of the class $CO_2$, $O_2$ and steam. The data and procedure are presented in this example with particular reference to the re-forming of natural gas comprising 90 percent $CH_4$ and 10 percent ethane employing steam as the oxidant.

Referring to Figure 1, ignited small-size coke, char or other suitable solid fuel is blasted with air, while it is confined as a deep bed in generator 1, by opening valve 4, the volume of air thus introduced into 1 being sufficient to fluidize the solid fuel. The air valve 16 is then opened to introduce secondary air into the fuel bed through bustle pipe 15. The products of combustion are passed out above through offtake 9, conduit 10, exchanger 11 and offtake 12. After about 3 minutes it will be found that the temperature in zones A and B approximate 2100° to 1900° F. The air valves 4 and 16 are now closed and simultaneously steam valve 5 is opened and then stack-gas valve 10 is closed simultaneously with the opening of gas valve 14. Now natural gas is introduced by opening valve 18-A, the mixed steam and natural gas pass up during this gas-making run into the bed from beneath it. The velocity of the gas stream in zone A during air blasting is approximately 2.2 feet per second which produces a bed of very low density in zone A but a denser bed in zone B. During the air-blasting period the packing in zone A becomes heated to about 2000° F. and stores considerable heat energy. The natural gas and steam, initially the major components of the stream passing up through the fuel bed during the gas-making period, are so proportioned that for each 1000 cubic feet of natural gas used about 100 pounds of steam are introduced therewith. The gas and steam are preferably preheated to a temperature above 500° F. The composition of the resulting gas is substantially as follows:

| | Percent by vol. |
|---|---|
| $CO_2$ | 8.4 |
| CO | 16.2 |
| $H_2$ | 68.5 |
| $CH_4$ | 5.9 |
| $C_2H_6$ | 0.0 |
| $N_2$ | 1.0 |
| | 100.0 |

The amount of carbon consumed during the gas-making run is calculated as 1.8 pounds per 1000 cubic feet of gas made and the volume swell figured on the basis of the natural gas used is 4.41 volumes from 1 volume of natural gas. The carbon burned during the gas-making run, calculated, was 7.8 pounds per 1000 cubic feet of natural gas used. The total solid fuel used per 1000 cubic feet of gas made, calculated as ash free, was 6.0 pounds. By increasing the ratio of steam to natural gas in the feed the volume ratio of $H_2$ to CO in the gas made is decreased and more water gas is made. The duration of the gas-making run is preferably longer than the air-blasting period, and is 4 minutes in this example and the initial velocity of the steam-natural gas mixture in zone A is less than 2.2 feet per second in order to maintain a denser bed in zones A and B, but particularly in zone A during the gas-making period; in this example it is 1.25 feet per second. After the temperature has dropped below a good gas-making temperature in zone B the run is discontinued and the cycle is repeated.

Variations in the procedure can be made in re-forming hydrocarbons by:

(a) Altering or varying the steam-hydrocarbon ratio in the feed during the gas-making period.

(b) Introducing a fluid stream containing steam and oxygen into the fuel bed during the gas-making period, into a zone between top and bottom as through bustle pipe 15 into zone B.

(c) Introducing hydrocarbon material into zone B during the gas-making run.

(d) Extending the run period by introducing a combustion supporting fluid at the bottom of the fuel bed during the gas-making period as by opening valve 4 or 6.

(e) Substituting $CO_2$ for some of the steam admitted into zone A during the gas-making run.

(f) Changing the relative rates of blasting during the air-blast and gas-making periods.

(g) Changing the temperature range for gas-making.

(h) Making a plurality of these changes.

It is understood that fresh solid fuel suitably fine and preferably free from very fine dust is fed into the generator from hopper 7 through valve 8 at a rate adapted to maintain the deep bed in the generator. Gas can be made having a higher calorific value by introducing enricher through valve 24 during the gas-making run or the run can be prolonged so that the methane content of the gas made is higher. This latter is not economical when re-forming methane but it is economical when higher-molecular-weight hydrocarbons are re-formed. Similarly, powdered coal may be supplied to the generator during the gas-making period and is best accomplished by introducing it into zone B. No special connection is shown for feeding powdered coal but valve 24 may be considered as a control valve for this purpose. A pretreated substantially de-ashed or low-ash coal should be used and it may be introduced during a portion of the gas-making run only, when so desired; the fore part of the run is preferred.

EXAMPLE 4

*Re-forming hydrocarbons without the use of solid fuel, but employing technique which otherwise is substantially like that in Example 3, referring to Figure 1*

In this example coarse silica sand was fluidized in the generator instead of fine size solid fuel. The silica solids are heated to a high temperature of the order of 1800° to 2000° F. by burning fuel with air in the bed of sand; the fuel may be introduced along with air by opening valves 4 and 30 at the bottom of the bed and this fuel may be gaseous, liquid or a powdered solid; the fuel may be introduced through valve 18-A when desired. The velocity of the gaseous stream passing up through the generator during the heating period is such that the sand is fluidized and the bed density is greater in zone B than in zone A. As in previously presented examples the rate of settling in the packed portion of the reactor, when a sudden decrease occurs in the superficial velocity of the fluidizing fluid, is slower in a packed zone than in a zone free of packing. With sand having particles closely sized and approximating 40 mesh size, it has been found that the bed density in zone B is about 82 pounds when the superficial velocity of the fluidizing stream is 1.5 feet per second, it is 70 pounds at 3.0 feet per second and approximately 66 pounds at 3.5 feet velocity of fluid flow therethrough. However, in the packed region the bed density also decreases as the velocity of the fluidizing agent increases, but of major importance in this case is the fact that at a given fluid velocity the bed density in a packed zone decreases as the size of the packing decreases, namely, as the size of the intersticial spaces decrease. When zone A contains ¾-inch Berl saddles the bed density of the sand is about 35 pounds with a gas velocity of 3.5 feet per second and about 62 pounds at a velocity of 1.0 foot per second; with ½-inch saddles the bed densities for velocities of 1 and 3.5 feet per second flow of fluidizing gas are, respectively, 55 and 27 pounds, whereas with large size saddles, 2-inch and larger, the bed density approaches but is somewhat lower than that which occurs in a zone free of packing.

The fuel used during this heating period may be quite completely consumed in zones A and B, liberating the maximum amount of heat therein; this heat is largely absorbed by the fluidized sand in these zones. This operation differs from similarly blasting a fixed bed because in the present case the solids (sand) are quite uniformly heated in these zones, A and B, as are also the solids of which the packing in zone A are comprised, whereas with a stationary bed the solids in the bottom portion are highly heated and those above are underheated. After the temperatures in zones A and B are suitably high for gas-making and a considerable amount of heat is stored in the packing in zone A, the supply of heating fuel and air is discontinued by closing valves 18-A, 4 and 30 while simultaneously opening valve 5 and introducing steam into the fuel bed. Immediately thereafter the hydrocarbon to be re-formed is introduced by opening valve 33 and the stack-gas valve 10 is closed simultaneously with the opening of the gas-offtake valve 14. The steam and hydrocarbon are well mixed before they pass as a common stream into the bed of fluidized sand. The gas-air velocity (superficial velocity) during the heating period in zone A is initially about 3.3 feet per second employing 1-inch saddles in this zone, giving a bed density therein of about 45 pounds; the bed density in free zone B during this heating period is about 65 pounds. During the re-forming period when the steam and hydrocarbon are introduced as a stream adjacent the bottom of the bed, the initial velocity of the stream is approximately 2 feet per second in the lower portion of zone A, giving a bed density at this location of about 60 pounds per cubic foot. In the upper portion of zone A during this period the bed density is lower because of the increase in volume due to re-forming reactions which are typified by Equations 3, 4, 5, 6 and 7 as follows:

(3) $\quad CH_4 + H_2O = CO + 3H_2$
(4) $\quad CH_4 + 2H_2O = CO_2 + 4H_2$
(5) $\quad C_2H_6 + 2H_2O = 2CO + 5H_2$
(6) $\quad C_2H_6 + 4H_2O = 2CO_2 + 7H_2$
(7) $\quad 2CH_4 + O_2 = 2CO + 4H_2$ The bed density is approximately 68 pounds in zone B during this gas-making period. After the temperature in zone A falls below a level satisfactory for making gas, as indicated by the use of thermocouple 27, the supply of hydrocarbon, natural gas in this example, is shut off by closing valve 33. After a few seconds the steam valve 5 is closed simultaneously with the opening of valves 4 and 30 to repeat the heating operation. Valve 10 is now opened simultaneously with the closing of valve 14 and the cycle is repeated. The composition of the gas depends largely on the temperature maintained in the reaction zones A and B during the gas-making period or, expressed differently, it depends on the cycle chosen. If the gas-making run is prolonged and the temperature decreases appreciably in zones A and B, more methane will pass through the generator undecomposed and the $CO_2$ content of the gas made will increase; likewise the calorific value will increase. In making gas at the high temperature range 1950° to 2000° F., the composition of the re-formed gas will be approximately as follows:

| | Volume percent |
|---|---|
| $CO_2$ | 4.6 |
| CO | 19.0 |
| Illuminants | Trace |
| $H_2$ | 72.4 |
| $CH_4$ | 2.9 |
| $C_2H_6$ | 0.0 |
| $N_2$ | 1.1 |
| | 100.0 |

Volume of gas made per 1000 cubic feet of natural gas re-formed_____ 4140 cubic feet
Steam used with the natural gas per 1000 cubic feet of gas made_____ 20 pounds
Total natural gas used per 1000 cubic feet of gas made, including the natural gas used as fuel for heating_____ 370 cubic feet
Temperature of the natural gas and steam used during the re-forming_____ Somewhat above 400° F.

The cycle is:

| | Minutes |
|---|---|
| Blasting with air and fuel gas | 3 |
| Blasting with steam and natural gas | 2 |
| Total | 5 |

A few seconds for purging the generator from blast gas is included in the gas-making period and is cared for by operation of the valves. The rich gas is purged at the end of the gas-making run by turning off the gas prior to the steam.

Variations under Example 4, believed to be within the scope of this invention, may include:

(a) Prolong the gas-making run to make a richer gas, particularly when using a gasiform hydrocarbon, or a mixture of hydrocarbons, having a calorific value higher than methane, for example, propane, butane, pentane and the like, or a mixeure containing such rich components. More steam is required using hydrocarbons having a high calorific value than with methane.

(b) Make occasional or regular introductions during the gas-making period of hydrocarbon, a mixture of steam and hydrocarbon, or a mixture containing both oxygen and a hydrocarbon into the generator at a zone intermediate the top and bottom as through bustle pipe 15.

(c) Introduce sufficient combustion-supporting gas along with the hydrocarbon admitted to the generator through 18-A or valve 33 by opening valve 6 so that very long gas-making runs can be made; steam may be used in appreciable amounts during these runs and preferably it and the gas are not highly superheated. There are limiting proportions since the temperature in the zones A and B must not rise above the point where sand particles stick together; this temperature limit is about 2000° F. for particles of 20 mesh size although higher temperatures may prevail with larger size fluidized solids. With this type operation the temperature in the upper zones, such as C, is higher than when short cycles are employed. It is found to be preferable to introduce some gas-making fluid in zone B particularly during a late portion of the prolonged run. This fluid may be a hydrocarbon with or without steam and it may be introduced through conduit 15 or 23, or both; the fluid may include coal dust and/or steam, particularly when the temperature in zones B and C is high, 1800° F. and higher.

(d) Generate a lean gas comprising largely $H_2$ and CO substantially as described, namely by introducing the gas-making fluids into the reactor adjacent the bottom of the bed of solids confined therein, which fluids comprise steam and a hydrocarbon, or a hydrocarbon and oxygen with or without steam, or a powdered solid fuel with an oxidizing agent, and then during at least a portion of the gas-making period introducing a carbureting material into an upper zone, such as zone B, by opening supply valve 24. This carbureting material may be a gaseous or liquid material typified by propane, petroleum refinery gas, butane, gasoline, naphtha, gas oil, fuel oil or other hydrocarbon substance. Any carbon depositing on the fluidized solids will ultimately be oxidized as the solids circulate through the system, that is, through zones A and B. The resulting gas may be of predetermed calorific standard suitable for distribution as city gas.

(e) Vary the mean size of the packing, that is, change relative sizes in the different zones A, C and D of the Figure 1. For a given superficial velocity of the gasiform fluids in the generator the actual linear velocity in the void spaces (interstices) in the packed zone varies inversely as the size of the packing solids. Expressed differently, with a given stream superficial velocity through different packed zones, each having different size packing, and fluidizing a given mass of solids in the packed zones, there are less fluidized solids per cubic foot in the zone containing the smallest size packing and vice versa, the zone containing the largest size packing confines the most dense bed of fluidized solids. Thus, in zone A during a heating period, it is frequently desirable to burn the fuel therein as completely to $CO_2$ and $H_2O$ as possible; the low density bed may be provided for this purpose by adjusting the size of the packing in zone A and the velocity of the combustion supporting fluid therethrough. Zone A is, among other things, a heat storage reservoir during the heating period. Zone C is a temperature equalizing zone; in it final gas-making reactions are largely completed and a greater bed density of the fluidized solids is usually desired, hence, larger size packing may be used. These variables may be adjusted according to the kind of gas to be made, the raw materials used, and the relative depth of zones A and C. On the other hand, when solids, such as silica, are fluidized in zone A and the heating is accomplished by burning fuel with air, each introduced from without, it is necessary to have plenty of fluidized solids in zone A for the purpose of heat transfer and for preventing the packing solids from becoming overheated in the bottom portion of that zone; this may be accomplished most readily when the size of the packing is not too small. Again, one frequently can use larger size packing in the lower portion of zone A and smaller size in the upper portion thereof with beneficial results and this also applies to the upper zones C and D.

(f) Operate quite continuously, maintaining high gas-making temperatures throughout the fluidized bed, removing the hot gas and passing it through a heat exchanger to generate steam and using the steam thus generated to make gas in the generator.

(g) Vary the diameters of Zones C and D relative to each other and relative to A and B so that different bed densities will prevail with common size packing in A, B and C or so that a chosen density will prevail in either zone because of the effect of change of diameter on superficial velocity of the gas stream in a particular zone.

EXAMPLE 5.—EXOTHERMIC REACTION

*The production of enriched gas by reactions of CO with $H_2$, with particular reference to Figure 2*

The reactions which are typical of the production of methane of this example are:

(8)   $CO + 3H_2 = CH_4 + H_2O$ (exothermic)
(9)   $2CO + 2H_2 = CH_4 + CO_2$ (exothermic)

These reactins are reversible, high temperatures favor them progressing from right to left, whereas at low temperatures they progress in the opposite direction. An increase in pressure favors the production of methane. At temperatures of 200° to 300° F. the rate of reaction is not rapid even when catalyzed, but at temperatures somewhat higher, as high even as 1000° F., the reactions proceed readily from left to right, i. e., with the formation of methane, particularly in the presence of a catalyst. Increasing the pressure in generator 1 favors the production of $CH_4$ by altering equilibria conditions. In fact, the reactions occur when the stream containing CO and $H_2$ is contacted with hot active carbon at temperatures of 1000° to 1300° F. The difficulty experienced heretofore in promoting such reactions in a fuel bed has been the lack of accurate temperature control in the fuel bed, there is ordinarily a hot zone, developed by virtue of the exothermic nature of the reaction, which tends to reverse the reaction. With reference to Figure 2 the procedure is as follows:

Coarse grain catalyst which may initially comprise iron oxide is fluidized as a deep bed in generator 1 by passing combustible gas up therethrough by opening valve 30. Combustion is promoted in this gas stream using air introduced into 1 through valve 4, the gases resulting therefrom are conducted out through offtake 9 and valve 10 as described above. After the temperature indicated by means of thermocouple 27 is about 1200° F., the air valve 4 is closed and a gas containing appreciable amounts of CO and $H_2$ is passed up through the catalyst at a fluidizing velocity by opening valve 34. Now valve 10 is closed and simultaneously valve 14 is opened and the stream containing reaction products is removed through conduit 13 and valve 14. The temperature in the catalyst mass will tend to increase and it is necessary to keep the temperature of the catalyst mass within limits in order to produce the optimum amount of hydrocarbon reaction products. The limit varies with the nature of the catalyst or contact solids used, although there is a definite status of the Reactions 8 and 9 for any stated temperature and pressure at equilibrium. Since equilibrium is not always reached in making rich gas from CO and $H_2$ at commercial stream velocities, other factors must be considered. In place of, or associated with an iron catalyst, a granular or fine size active carbon such as lignite char, carbonized sub-bituminous coal or other carbonaceous solid fuel may be used as the fluidized solids. In this case it is preferred to operate with a temperature in the bed in B and C at about 1200° to 1400° F., whereas with active catalyst a lower temperature is preferred, namely, about 900° to 1100° F. When carbon is the catalyst it is believed some reaction of hydrogen with carbon occurs such as is shown by Equation 10:

(10)   $C + 2H_2 = CH_4$ (exothermic)

Because of the tendency for more condensable hydrocarbons to form at lower temperatures, it is usually desirable to employ an operating temperature above that temperature range.

Furthermore, superatmospheric pressure is desirable, such as 10, 20, 30, 40 or 50 atmospheres; higher pressures could be used. High pressure permits a lower superficial velocity to be employed because of the increased gas density; the bed density is lower for a given superficial velocity as pressure increases.

Although high pressures favor the desired production of methane it will be noted that the reaction of Equation 11 is also favored by an increase in pressure:

(11)  $$2CO = CO_2 + C$$

This is particularly true with an iron catalyst and at pressures above about 25 atmospheres. The effect of carbon formation according to Equation 11 is minimized by the presence of steam. Thus, with reference to Equations 8 and 9 the introduction of steam or $CO_2$, respectively, with the reaction mixture tends to cause more of Reaction 9 or 8, respectively, to occur and simultaneously to minimize carbon formation. It appears that iron carbide is the most active iron catalyst for the formation of carbon, and steam reacts to destroy the carbide. Steam may be introduced when necessary through either valve 5 or valve 17.

The gas stream containing reaction products is cooled to condense water and other condensable matter and while under pressure it is scrubbed for removal of $CO_2$ and is then used, as is or blended, for distribution as city gas or for other purposes.

The amount of heat generated above 60° F. during the production of 1000 cubic feet of methane according to Equations 8 and 9 is approximately 285,000 B. t. u. This is a very appreciable percentage of the 1,015,000 B. t. u. heat of combustion of the said 1000 cubic feet of methane. Now, in generating the 4000 cubic feet of water gas required to make 1000 cubic feet of methane, the process steam required allowing for customary losses can be produced by utilizing the available excess heat, namely, heat of formation of the methane. Simple means for accomplishing this are shown in Figure 2 which employs a water wall preferably adjacent an upper zone of the generator, which zone confines fluidized, small-size solids free to move in ebullient motion throughout, and which zone is bordered beneath and preferably above also by a packed section. Thus, the hot particles of solids (fluidized solids) rising through zone C give up heat to the water in jacket 35, forming steam which flows into steam drum 37 through conduit 36; water is supplied from 37 to the jacket through conduit 38 and it is supplied to 37 through valve 39, whereas steam is withdrawn through valve 40. This steam is preferably used in making water gas in apparatus not shown. The water wall affords means of cooling the fluidized solids within so that they then tend to travel downwardly, and it also offers further opportunity for the upwardly flowing stream within the generator to contact these solids at a suitable reaction temperature.

In this example (Example 5), the packing in zone A functions as a preheating zone, bringing the reactants up to reaction temperature and the velocity of fluid flow through zone A is such that the bed density is low, lower than in zone B. The main reaction zone is B although appreciable reaction occurs in zones C and F. The packing in zone C is large so that there is appreciable mixing of the fluidized solids in zones B, C and F. When carbonaceous fine size solids are used in conjunction with sand or the like, the former solids work their way to the upper zone adjacent the top when they are not consumed and do not return down again; they remain on top until consumed, whereas the sand particles circulate up and down in ebullient motion beneath any carbonaceous solids which may be present.

It will be understood that in making combustible gas by methods such as have been described in the foregoing, it is preferable to employ as packing material in the packed zones regularly shaped solids of much greater size than the solids which are fluidized; these solids are not poured in at random as one might pour spheres or Berl saddles into a generator, but rather are placed in spaced formation with respect to one another, such as checker bricks are commonly placed in the gas-making carburetors. With this type of packing the channels through the packed masses are regular, the gases passing through the packed masses pass through a more or less tortuous course but through regularly provided channels. The advantage of employing packing of this particular kind is that there is less channeling due to stoppages or plugging in the packed zone and the fluidized solids in the packed zone are maintained, or may be maintained, in a denser mass than when the packing is poured in at random. The expression "checkered zone" as used in the claims, refers to a zone in the generator having a mass of placed and spaced solids which solids may be of the checker-brick type or short tubes, or they may be other shapes which will provide the desired free space and tortuous pass for the fluids. One such packing material has been described in a U. S. patent previously granted to me. The size of the packing solids might vary in the different packed zones in accordance with the effect desired, being chosen with respect to the gas velocities, density of the bed desired in the packed zone and diameter of the generator. It has been found that when gas is made in operating by alternately air blasting and steaming a bed of finely divided solids, it is difficult to prevent appreciable settling of the solids between the air-blasting and steaming periods. Once settling has occurred, it is difficult and time consuming to again provide complete fluidization of the solids which solids may comprise combustible matter. The use of checkered zones is a material aid in eliminating this difficulty. It will be understood that the solids used in the checkered zones may be of metal alloy, silicon carbide, alumina, chromite or other chosen heat-resistant material; the metal alloys are well adapted for this use within known temperature limitations and when the atmosphere is not too corrosive at the prevailing temperature.

Special attention is called to the fact that the solids fluidized in the generator in the practice of this invention are substantially all in a common bed which bed exists as a plurality of strata, the various strata having different bed densities according to the conditions of operation as outlined. In a pending application, Serial No. 582,692, filed by me March 14, 1945, now Patent No. 2,503,291, dated April 11, 1950, a different procedure for creating a stratified bed of fluidized solids was shown; that procedure can be employed in conjunction with the operation of the generators of the figures in this case when desired. A plurality of different small size solids of different density may be fluidized in the generator when desired; the denser solids tending to form a bottom layer. In practicing this the inventor has found that when coarse silica and similarly sized coal or coke are fluidized employing a high velocity of the fluidizing stream, air in this case, the mixture of the solids is fluidized without separation. When combustion is promoted in this bed the solids may be heated to a high temperature. Now, when steam is passed up through the bed at a lower velocity the silica particles segregate as a lower stratum and the heat is given up by the silica particles to the steam which passes on up through the upper layer (incandescent layer) of solid fuel and reacts with the latter fuel by water gas reactions. This cycle can be repeated. This is distinctly new in the art so far as I am aware.

The total depth of the bed of the fluidized solids preferred is usually 20 to 30 feet although deeper beds may be used and, under particular conditions, shallower beds may be employed. Deep beds of the kind described have not thus been used heretofore, so far as I am aware, because of blow-over difficulties whereby fines are entrained in the gas stream and whereby pockets of gas pass through the bed without making good contact with the fluidized solids. The checker bricks make possible the use of deep beds. Reference has been made to a plurality of layers of checker bricks but it is possible to employ one deep layer which should extend from adjacent but preferably above the bottom of the bed to substantially the top of the bed; this is used to best advantage when the major gasiform reactants are introduced entirely at the bottom of the bed. The mass of arranged and spaced checkers, in the single deep layer, may be such that the spacing or channels are not of uniform dimensions throughout but may be greater at the top, bottom or middle zone, to provide a chosen bed-density condition. However, it is usually preferably to have the top-zone bed-density such that a minimum amount of entrainment of fine solids in the stream of reaction products occurs.

Having described my invention so that one skilled in the art can practice it, making variations and modifications not given in the specific examples, I claim:

1. The process of making combustible gas comprised of CO and $H_2$ from reactants adapted to yield said CO and $H_2$ by reaction at elevated temperatures, in an elongated upright generator having a deep mass of checkerwork confined therein as a pervious stratum extending across it between the top and bottom thereof, comprising, disposing a deep body of finely divided solids in said generator in part in the intersticial space of said mass and also above said mass, densely fluidizing the thus disposed solids as a deep, single, substantially stationary, continuous bed, having a well defined top level in said generator above said mass, by passing a gasiform stream initially containing a combustion supporting fluid and a fuel upwardly at a particular fluidizing velocity through said bed of solids and through said intersticial space, promoting combustion of said fuel in said stream in said bed thereby heating both the said solids and said checkerwork to a reaction temperature below about 1800° F., discontinuing the heating operation after the reaction temperature has been reached in said bed, then similarly passing a gasiform stream initially containing steam and at least one combustible reactant upwardly at a superatmospheric pressure through said bed at a velocity that maintains said solids in said densely fluidized state in said bed, thereby making said combustible gas in the latter stream in said bed, and discharging the latter gas in said latter stream from above said bed and recovering it, meanwhile confining said solids in said bed in said generator substantially as a permanently retained body; said particular velocity being such that top to bottom circulation of said solids in said bed is inhibited.

2. The process of making combustible gas by reacting gas-making substance at elevated temperatures in an upright, elongated generator having a deep mass of checkerwork confined therein as a pervious stratum extending across it between the top and bottom thereof, comprising, disposing a deep body of finely divided solids in said generator in part in the interstitial space of said mass and also below said mass, densely fluidizing the thus disposed solids as a deep, single, substantially stationary, continuous bed having a well defined top level in said generator, by first passing a gasiform stream initially containing a combustion supporting fluid and a fuel upwardly at a particular fluidizing velocity through said bed of solids and through said interstitial space, promoting combustion of said fuel in said stream in said bed thereby heating both the said solids and said checkerwork to a reaction temperature below 2000° F., discontinuing the heating operation after reaction temperature has been reached in said bed, then similarly passing a gasiform stream initially containing steam and at least one combustible reactant selected from the group which consists of gasiform hydrocarbons and powdered coal upwardly under superatmospheric pressure through said bed from beneath it at a velocity that maintains said solids in said densely fluidized state in said bed thereby making said combustible gas in the latter stream in said bed, discharging the latter gas in said latter stream and recovering it, meanwhile confining said solids in said bed substantially as a permanently retained body; said particular velocity being such that top to bottom circulation of said solids in said bed is inhibited.

3. The process defined in claim 2 in which the gas-making fluid stream initially comprising steam and a combustible reactant also initially contains oxygen.

4. The process defined in claim 2 in which the gas-making fluid stream initially comprises both a hydrocarbon and said steam.

5. The process defined in claim 2 in which the gas-making stream, initially containing said steam and at least one combustible reactant, is initially preheated to a temperature above 400° F.

6. The process defined in claim 2 in which an additional supply of a gasiform gas-making substance is introduced into a zone of said bed between the top and bottom thereof while said steam and said reactant are being introduced into said bed from beneath it.

References Cited in the file of this patent

UNITED STATES PATENTS

| Number | Name | Date |
|---|---|---|
| 1,840,649 | Winkler et al. | Jan. 12, 1932 |
| 1,857,799 | Winkler | May 10, 1932 |
| 2,359,310 | Hemminger | Oct. 3, 1944 |
| 2,363,274 | Wolk et al. | Nov. 21, 1944 |
| 2,443,673 | Atwell | June 22, 1948 |
| 2,448,290 | Atwell | Aug. 31, 1948 |
| 2,472,502 | Tyson | June 7, 1949 |
| 2,494,337 | Hemminger | Jan. 10, 1950 |
| 2,515,156 | Jahnig et al. | July 11, 1950 |
| 2,533,026 | Matheson | Dec. 5, 1950 |

FOREIGN PATENTS

| Number | Country | Date |
|---|---|---|
| 321,422 | Great Britain | Nov. 4, 1929 |
| 498,094 | Great Britain | Jan. 3, 1939 |